(12) United States Patent
Meng et al.

(10) Patent No.: US 12,089,321 B2
(45) Date of Patent: Sep. 10, 2024

(54) INDUCTION COOKER AND OPERATION METHOD THEREOF

(71) Applicant: Delta Electronics, Inc., Taoyuan (TW)

(72) Inventors: Yu-Min Meng, Taoyuan (TW); Jhih-Hong Gao, Taoyuan (TW); Chun-wei Lin, Taoyuan (TW); Yu-Tsung Lee, Taoyuan (TW); Chun Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 522 days.

(21) Appl. No.: 16/875,477

(22) Filed: May 15, 2020

(65) Prior Publication Data

US 2021/0068210 A1   Mar. 4, 2021

(30) Foreign Application Priority Data

Aug. 29, 2019 (CN) .......................... 201910808035.0

(51) Int. Cl.
*H05B 1/02* (2006.01)
*H02H 1/00* (2006.01)
(Continued)

(52) U.S. Cl.
CPC ......... *H05B 6/1209* (2013.01); *H02H 1/0007* (2013.01); *H02H 3/08* (2013.01);
(Continued)

(58) Field of Classification Search
CPC ...... H02H 1/0007; H02H 3/08; H05B 1/0266; H05B 2213/05; H05B 6/04; H05B 6/062; H05B 6/1209
See application file for complete search history.

(56) References Cited

U.S. PATENT DOCUMENTS

| 4,749,836 | A | * | 6/1988 | Matsuo | ................ H05B 6/1272 |
| | | | | | 219/626 |
| 6,770,857 | B2 | * | 8/2004 | Hirota | ...................... H05B 6/04 |
| | | | | | 219/626 |
| 6,894,255 | B2 | * | 5/2005 | Fujii | ...................... H05B 6/062 |
| | | | | | 126/373.1 |

FOREIGN PATENT DOCUMENTS

| CN | 104284464 A | 1/2015 |
| CN | 107438299 A * | 12/2017 .............. H02M 1/32 |

(Continued)

OTHER PUBLICATIONS

Machine translation of CN-107438299: Zhao, Induction Cooker, 2017 (Year: 2017).*

(Continued)

*Primary Examiner* — Janie M Loeppke
*Assistant Examiner* — Abigail H Rhue
(74) *Attorney, Agent, or Firm* — MUNCY, GEISSLER, OLDS & LOWE, P.C.

(57) ABSTRACT

An induction cooker includes a rectifying device, a first energy-storage device, a switch device, a second energy-storage device, a heating device and a control device. The capacitance of the second energy-storage device is greater than the capacitance of the first energy-storage device. When the induction cooker is just starting, the control device controls the switch device to be turned off, such that the heating device generates an output current according to an energy of the first energy-storage device. The control device determines whether a pot is on the heating device according to a change state of the output current. When the pot is on the heating device, the control device controls the switch device to be turned on, such that the first and second energy-storage devices are coupled, and the heating device heats the pot according to energies of the first and second energy-storage devices.

10 Claims, 8 Drawing Sheets

(51) Int. Cl.
　　　*H02H 3/08*　　　(2006.01)
　　　*H05B 6/04*　　　(2006.01)
　　　*H05B 6/06*　　　(2006.01)
　　　*H05B 6/12*　　　(2006.01)

(52) U.S. Cl.
　　　CPC ............ *H05B 1/0266* (2013.01); *H05B 6/04* (2013.01); *H05B 6/062* (2013.01); *H05B 2213/05* (2013.01)

(56) References Cited

FOREIGN PATENT DOCUMENTS

| EP | 1341401 | A2 | | 9/2003 | |
|----|---------|----|---|--------|---|
| EP | 3346799 | A1 | | 7/2018 | |
| EP | 3768042 | A1 | * | 1/2021 | ............ H05B 6/062 |
| KR | 100518167 | B1 | * | 6/2002 | |

OTHER PUBLICATIONS

Machine translation of KR-100518167: Lee, An induction heating type cooking apparatus using a self-oscilating type half-bridge driver IC, 2002 (Year: 2002).*

Office Action mailed Jun. 29, 2022 in CN Application No. 201910808035.0, 8 pages.

\* cited by examiner

INDUCTION COOKER AND OPERATION METHOD THEREOF

CROSS REFERENCE TO RELATED APPLICATIONS

This application claims priority of China Patent Application No. 201910808035.0, filed on Aug. 29, 2019, the entirety of which is incorporated by reference herein.

BACKGROUND OF THE INVENTION

Field of the Invention

The present invention relates to an induction cooker, and in particular, it relates to an induction cooker and an operation method thereof.

Description of the Related Art

In general, the induction cooker may have a function for detecting the pot. The purpose is that before the induction cooker is started, the induction cooker may firstly detect whether the correct pot is placed on the surface of the cooker. For the principle of detecting the pot, a pulse width modulation (PWM) signal with a fixed frequency is used to drive a switch (such as an insulated gate bipolar transistor (IGBT)) in an inverter circuit. At the same time, a current may flow through the coil inside the inverter, and the current pot information may be obtained by a phase difference between the coil current and the coil voltage.

However, when the induction cooker detects the pot, the induction cooker may transiently generate a large amount of energy, so that the current flowing through coil inside the inverter may also become large. Usually, it causes the pot to vibrate to generate a click sound, so that the user may have a noise problem in use. Therefore, how to effectively reduce the noise caused by the pot detecting operation has become the focus for technical improvements by various manufacturers.

BRIEF SUMMARY OF THE INVENTION

The present invention provides an induction cooker and an operation method thereof, thereby reducing a transient current change rate generated by the heating device and reducing a noise caused by a pot detecting operation.

The present invention provides an induction cooker, which includes a rectifying device, a first energy-storage device, a switch device, a second energy-storage device, a first heating device and a control device. The rectifying device is configured to receive an alternating-current voltage and to convert the alternating-current voltage into a direct-current voltage. The first energy-storage device is coupled to the rectifying device and configured to receive the direct-current voltage and to store energy. The switch device is coupled to the second energy-storage device and configured to be controlled by a control signal. The capacitance of the second energy-storage unit is greater than the capacitance of the first energy-storage unit. The first heating device is coupled to the first energy-storage device and the switch device. The control device, coupled to the switch device and the first heating device. The control device generates the control signal to control the switch device to be turned off and then outputs pulse control signals, so that the first heating device generates a first output current according to the energy of the first energy-storage device. The control device determines whether a first pot is on the first heating device according to a change state of the first output current. when determining that the first pot is on the first heating device, the control device generates the control signal to control the switch device to be turned on, so that the first energy-storage device is coupled to the second energy-storage device and the pulse control signals are outputted, so that the first heating device heats the first pot according to the energy of the first energy-storage device and an energy of the second energy-storage device In addition, the present invention provides an operation method of an induction cooker, which includes the following steps. A control signal is generated to control a switch device to be turned off, so that a first heating device generates a first output current according to an energy of a first energy-storage device. It is determined whether a first pot is on the first heating device according to a change state of the first output current. When determining that the first pot is on the first heating device, the control signal is generated to control the switch device to be turned on, so that the first energy-storage device is coupled to a second energy-storage device, and the first heating deice heats the first pot according to the energy of the first energy-storage device and an energy of the second energy-storage device. The capacitance of the second energy-storage device is greater than the capacitance of the first energy-storage device.

According to the induction cooker and the operation method thereof of the present invention, the control device generates the control signal to control the switch device to be turned off, so that the first heating device generates the first output current according to the energy of the first energy-storage device. The control device determines whether the first pot is on the first heating device according to the change state of the first output current. When determining that the first pot is on the first heating device, the control device generates the control signal to control the switch device to be turned on, so that the first energy-storage device is coupled to the second energy-storage device, and the first heating deice heats the first pot according to the energy of the first energy-storage device and the energy of the second energy-storage device. Therefore, a transient current change rate generated by the heating device may be effectively reduced and a noise caused by a pot detecting operation is also reduced.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents an element or component that is the same or similar.

Figure 1:
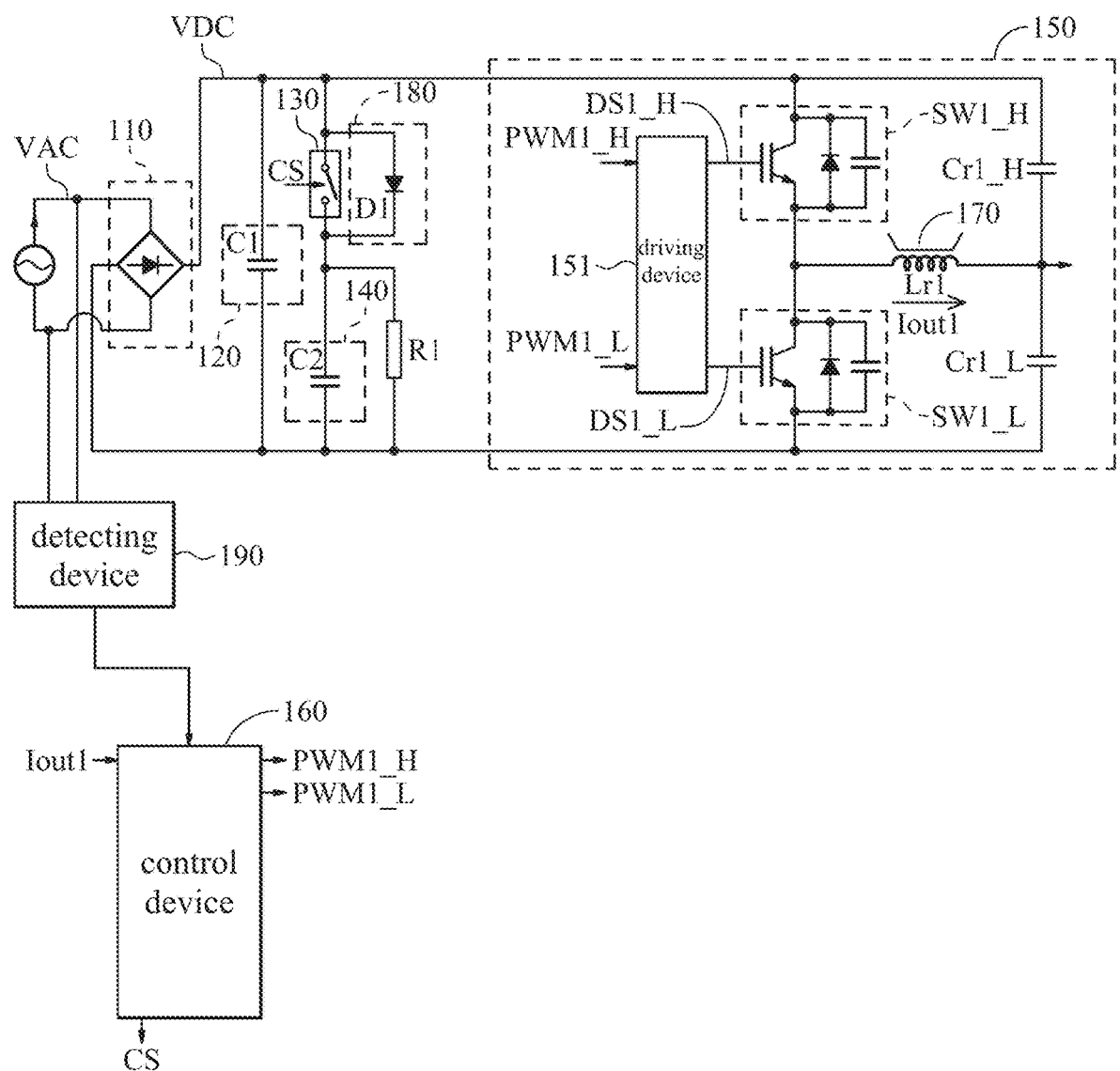
FIG. 1 shows a schematic view of an induction cooker according to an embodiment of the present invention.

FIG. 1 shows a schematic view of an induction cooker according to an embodiment of the present invention. Please refer to FIG. 1. The induction cooker 100 includes a rectifying device 110, a first energy-storage device 120, a switch device 130, a second energy-storage device 140, a heating device 150 and a control device 160.

The rectifying device 110 is coupled to an alternating current power source, and is configured to receive an alternating-current voltage VAC and to convert the alternating-current voltage VAC into a direct-current voltage VDC. In the embodiment, the rectifying device 110 may be a bridge rectifier, such as a full bridge rectifier or a half bridge rectifier.

The first energy-storage device 120 is coupled to the rectifying device 110 and configured to receive the direct-current voltage VDC and to store energy. In the embodiment, the first energy-storage device 120 includes a capacitor C1. The capacitor C1 has a first terminal and a second terminal. The first terminal of the capacitor C1 is coupled to a positive output terminal of the rectifying device 110, and the second terminal of the capacitor C1 is coupled to a negative output terminal of the rectifying device 110.

The switch device 130 is coupled to the first energy-storage device 120 and the second energy-storage device 140. In addition, the switch device 130 is controlled by a control signals CS to be turned on or turned off accordingly. For example, when the control signal CS is a high logic level, the switch device 130 is turned on. When the control signal CS is a low logic level, the switch device 130 is turned off. Furthermore, the switch device 130 has a first terminal, a second terminal and a control terminal. The first terminal of the switch device 130 is coupled to the first terminal of the capacitor C1. The second terminal of the switch device 130 is coupled to a first terminal of a capacitor C2. The control terminal of the switch device 130 receives the control signal CS.

The second energy-storage device 140 is coupled to the switch device 130. In the embodiment, the second energy-storage device 140 includes the capacitor C2. The capacitor C2 has the first terminal and a second terminal. The first terminal of the capacitor is coupled to the second terminal of the switch device 130. The second terminal of the capacitor C2 is coupled to the second terminal of the capacitor C1. In addition, the capacitance of the second energy-storage device 140 is greater than the capacitance of the first energy-storage device 120, i.e., the capacitance of capacitor C2 is greater than the capacitance of capacitor C1.

The heating device 150 is coupled to the first energy-storage device 120, the switch device 130 and the second energy-storage device 140. The heating device 150 may be an inverter and is suitable to heat a pot 170. In the embodiment, the heating device 150 includes a driving device 151, a high-frequency switch device SW1_H, a high-frequency switch device SW1_L, a coil Lr1, a capacitor Cr1_H and a capacitor Cr1_L. The driving device 151 receives a pulse control signal PWM1_H and a pulse control signal PWM1_L generated by the control device 160. The driving device 151 generate a driving signal DS1_H and a driving signal DS1_L according to the pulse control signal PWM1_H and the pulse control signal. The pulse control signal PWM1_H corresponds to the driving signal DS1_H, and the pulse control signal PWM1_L corresponds to DS1_L.

The high-frequency switch device SW1_H has a first terminal, a second terminal and a control terminal. The first terminal of the high-frequency switch device SW1_H is coupled to the first terminal of the capacitor C1 and the first terminal of the switch device 130. The second terminal of the high-frequency switch device SW1_H is coupled to the first terminal of the high-frequency switch device SW1_H. The control terminal of the high-frequency switch device SW1_H receives the driving signal DS1_H. In addition, the high-frequency switch device SW1_H is controlled by the driving signal DS1_H to be turned on or turned off accordingly.

The high-frequency switch device SW1_L has a first terminal, a second terminal and a control terminal. The first terminal of the high-frequency switch device SW1_L is coupled to the second terminal of the high-frequency switch device SW1_H. The second terminal of the high-frequency switch device SW1_L is coupled to the second terminal of the capacitor C1. The control terminal of the high-frequency switch device SW1_H receives the driving signal DS1_L. In addition, the high-frequency switch device SW1_L is controlled by the driving signal DS1_L to be turned on or turned off accordingly.

The coil Lr1 has a first terminal and a second terminal. The first terminal of the coil Lr1 is coupled to the second terminal of the high-frequency switch device SW1_H and the first terminal of the high-frequency switch device SW1_L. An output current Iout1 flows through the coil Lr1. The capacitor Cr1_H has a first terminal and a second terminal. The first terminal of the capacitor Cr1_H is coupled to the first terminal of the high-frequency switch device SW1_H. The second terminal of the capacitor Cr1_H is coupled to the second terminal of the coil Lr1. The capacitor Cr1_L has a first terminal and a second terminal. The first terminal of the capacitor Cr1_L is coupled to the second terminal of the coil Lr1. The second terminal of the capacitor Cr1_L is coupled to the second terminal of the high-frequency switch device SW1_L.

The control device 160 is coupled to the switch device 130 and heating device 150. The control device 160 generates the control signal CS to control the switch device 130 to be turned off, so that the heating device 150 generates the output current Iout1 according to the energy of the first energy-storage device 120, i.e., the output current Iout1 generated by the coil Lr1 according to the energy of the capacitor C1. The control device 160 determines whether the pot 170 is disposed on the heating device 150 according to the change state of the output current Iout1.

When determining that the pot 170 is disposed on the heating device 150, it indicates that an electromagnetic induction is occurred on the coil Lr1 of the heating device 150 and the pot 170, so that the state of the output current Iout1 of the coil Lr1 is changed. Then, the control device 160 generates the control signal CS to control the switch device 130 to be turned on, so that the first energy-storage device 120 is coupled to the second energy-storage device 140, and the heating device 150 heats the pot 170 according to the energy of the first energy-storage device 120 and the energy of the second energy-storage device 140.

In addition, when determining that the pot 170 is not disposed on the heating device, it indicates that the state of the output current Iout1 is not changed. The control device 160 generates the control signal CS to control the switch device 130 to keep being turned off, and continuously determines whether the pot 170 is disposed on the heating device 150. Therefore, since a pot detecting operation is performed by using the energy of the first energy-storage device 120 having small capacitance, the transient current change rate generated by the heating device 150 may be effectively reduced, and the noise caused by the pot detecting operation is also reduced.

Furthermore, the control device 160 provides a pulse control signal PWM1_H and a pulse control signal PWM1_L to the heating device 150. That is, the control device 160 provides the pulse control signal PWM1_H and the pulse control signal PWM1_L to the driving device 151 of the heating device 150. In the embodiment, the pulse control signal PWM1_H is complementary to the second pulse control signal PWM1_L. That is, when the pulse control signal PWM1_H is a high logic level, the pulse control signal PWM1_L is a low logic level. When the pulse control signal PWM1_H is the low logic level, the pulse control signal PWM1_L is the high logic level.

Figure 2A:
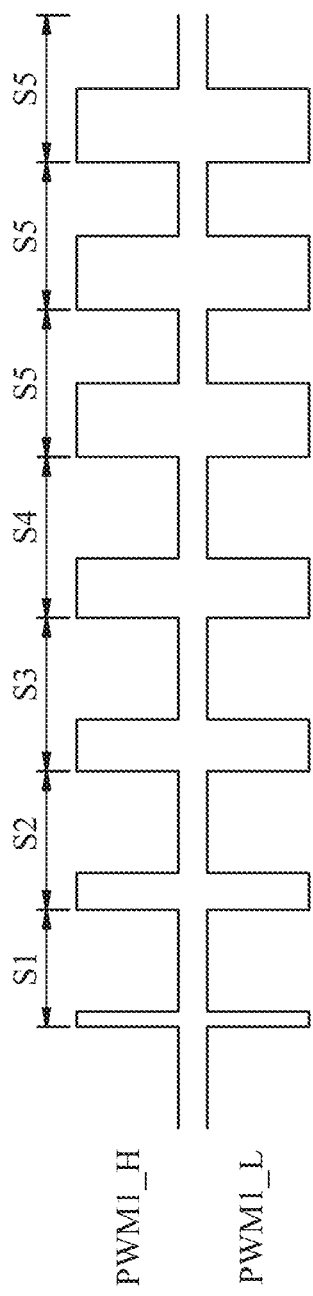
FIGS. 2A to 2D show a schematic view of a pulse-wave control signal according to an embodiment of the present invention.
Figure 2B:
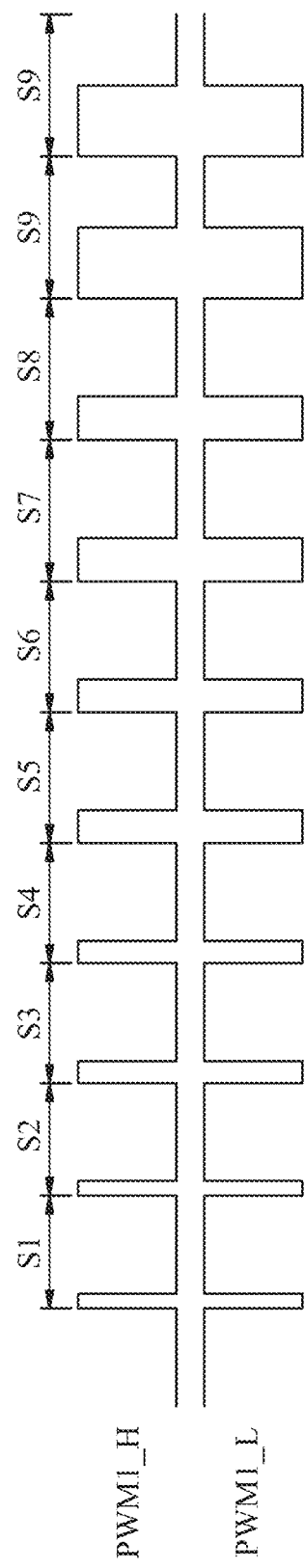

Furthermore, the control device 160 firstly set a duty cycle of the pulse control signal PWM1_H to a first ratio, and then gradually increases the duty cycle of the pulse control signal PWM1_H from the first ratio to a second ratio, as shown in FIG. 2A and FIG. 2B, respectively.

In FIG. 2A, the duty cycle of the signal S1 is the first ratio. The ratio of the duty cycle of the signal S2 is greater than the ratio of the duty cycle of the signal S1. The ratio of the duty cycle of the signal S3 is greater than the ratio of the duty cycle of the signal S2. The ratio of the duty cycle of the signal S4 is greater than the ratio of the duty cycle of the signal S3. The ratio of the duty cycle of the signal S5 is greater than the ratio of the duty cycle of the signal S4. The ratio of the duty cycle of the signal S5 is the second ratio. Then, the duty cycle of the pulse control signal PWM1_H maintains the ratio of the duty cycle of the signal S5.

In FIG. 2B, the duty cycle of the signal S1 is the first ratio. The ratio of the duty cycle of the signal S2 is the same as the ratio of the duty cycle of the signal S1. The ratio of the duty cycle of the signal S3 is greater than the ratio of the duty cycle of the signal S2. The ratio of the duty cycle of the signal S4 is the same as the ratio of the duty cycle of the signal S3. The ratio of the duty cycle of the signal S5 is greater than the ratio of the duty cycle of the signal S4. The ratio of the duty cycle of the signal S6 is the same as the ratio of the duty cycle of the signal S5. The ratio of the duty cycle of the signal S7 is greater than the ratio of the duty cycle of the signal S6. The ratio of the duty cycle of the signal S8 is the same as the ratio of the duty cycle of the signal S7. The ratio of the duty cycle of the signal S9 is greater than the ratio of the duty cycle of the signal S8. The ratio of the duty cycle of the signal S9 is the second ratio. Then, the duty cycle of the pulse control signal PWM1_H maintains the ratio of the duty cycle of the signal S9.

Figure 2C:
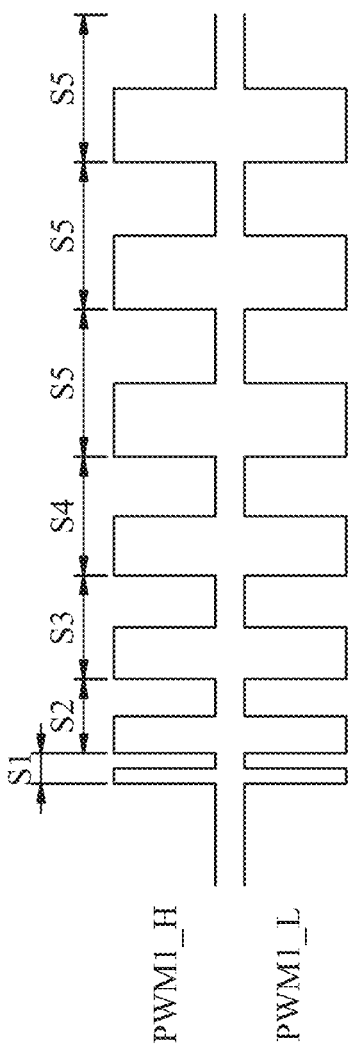
Figure 2D:
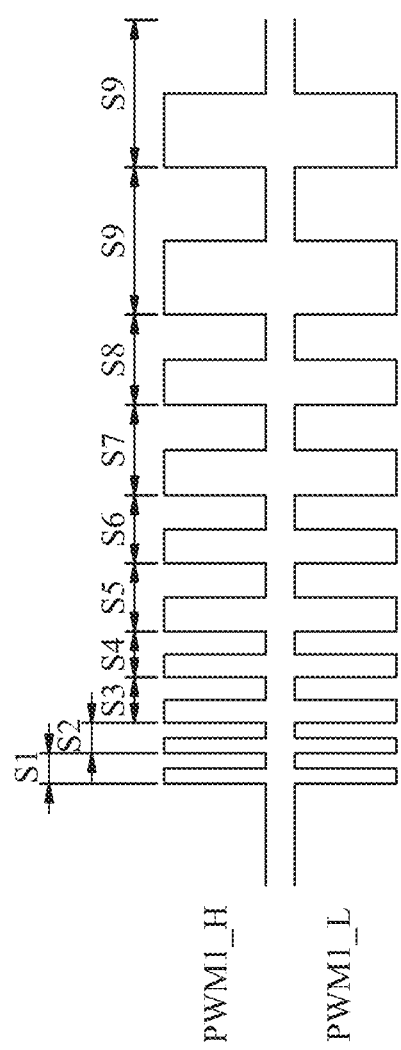

In addition, the ratio adjustment of the pulse control signal PWM1_H as shown in FIG. 2A and FIG. 2B is merely an exemplary embodiment of the present invention, but the embodiment of the present invention is not limit thereto. In the embodiment, the first ratio is, for example, 5%~10%, and the second ratio is, for example, 45%~55%. Furthermore, the second ratio may be, for example, 50%. In addition, the pulse control signals PWM1_H and PWM1_L may also be control signals with fixed duty cycle and variable working frequency. That is, the control device 160 firstly set the working frequency of the pulse control signal PWM1_H to a first frequency, and then gradually increases the working frequency of the pulse control signal PWM1_H from the first frequency to a second frequency, as shown in FIG. 2C and FIG. 2D, respectively.

As a result, for the pot detecting operation, the induction cooker 100 provides the energy of the first energy-storage device 120 and further gradually increases the duty cycle of the pulse control signal PWM1_H from the first ratio to the second ratio through the control device 160. Therefore, the transient current change rate generated by the heating device may be effectively reduced and the noise caused by the pot detecting operation is also reduced.

In addition, when determining that the pot 170 is not disposed on the heating device 150, the control device 160 controls the switch device to maintain to be turned off, and the control device 160 may also reset the duty cycle of the pulse control signal PWM1_H. That is, the control device 160 reset the duty cycle of the pulse control signal PWM1_H to the first ratio, and again gradually increases the duty cycle of the pulse control signal PWM1_H from the first ratio to the second ratio and continuously determines whether the pot 170 is disposed on the heating device 150.

Furthermore, the induction cooker 100 further includes a protection device 180. The protection device 180 is coupled to the switch device 130 in parallel. When an overcurrent is occurred, the protection device 180 is activated to release the overcurrent. In the embodiment, the protection device 180 includes a diode D1, wherein an anode terminal of the diode D1 is coupled to the first terminal of the switch device 130 and a cathode terminal of the diode D1 is coupled to the second terminal of the switch device 130. For example, during the pot detecting operation (i.e., the switch device 130 is turned off), when a lightning strike produces a transient voltage spike that cause an overcurrent, the diode D1 of the protection device 180 may be turned on to introduce overcurrent to the second energy-storage device with the larger capacitance. Therefore, damage to the circuit components may be effectively avoided and overcurrent tolerance may be increased.

Furthermore, the induction cooker 100 further includes a resistor R1, wherein the resistor R1 has a first terminal and a second terminal. The first terminal of the resistor R1 is coupled to the protection device 180 (i.e., the cathode terminal of the diode D1). The second terminal of the resistor R1 is coupled to the second terminal of the second energy-storage device. When overcurrent is generated and the protection device 180 is activated, the resistor R1 may provide a discharging path to release the overcurrent.

In addition, the induction cooker 100 further includes a detecting device 190. The detecting device 190 is coupled to the control device 160. The detecting device 190 receives the alternating-current voltage VAC to generate a detecting signal, wherein the detecting signal includes the change state of the alternating-current voltage VAC. Then, the detecting device 190 provides the detecting signal to the control device 160, so as to perform the subsequent operation.

Figure 3:
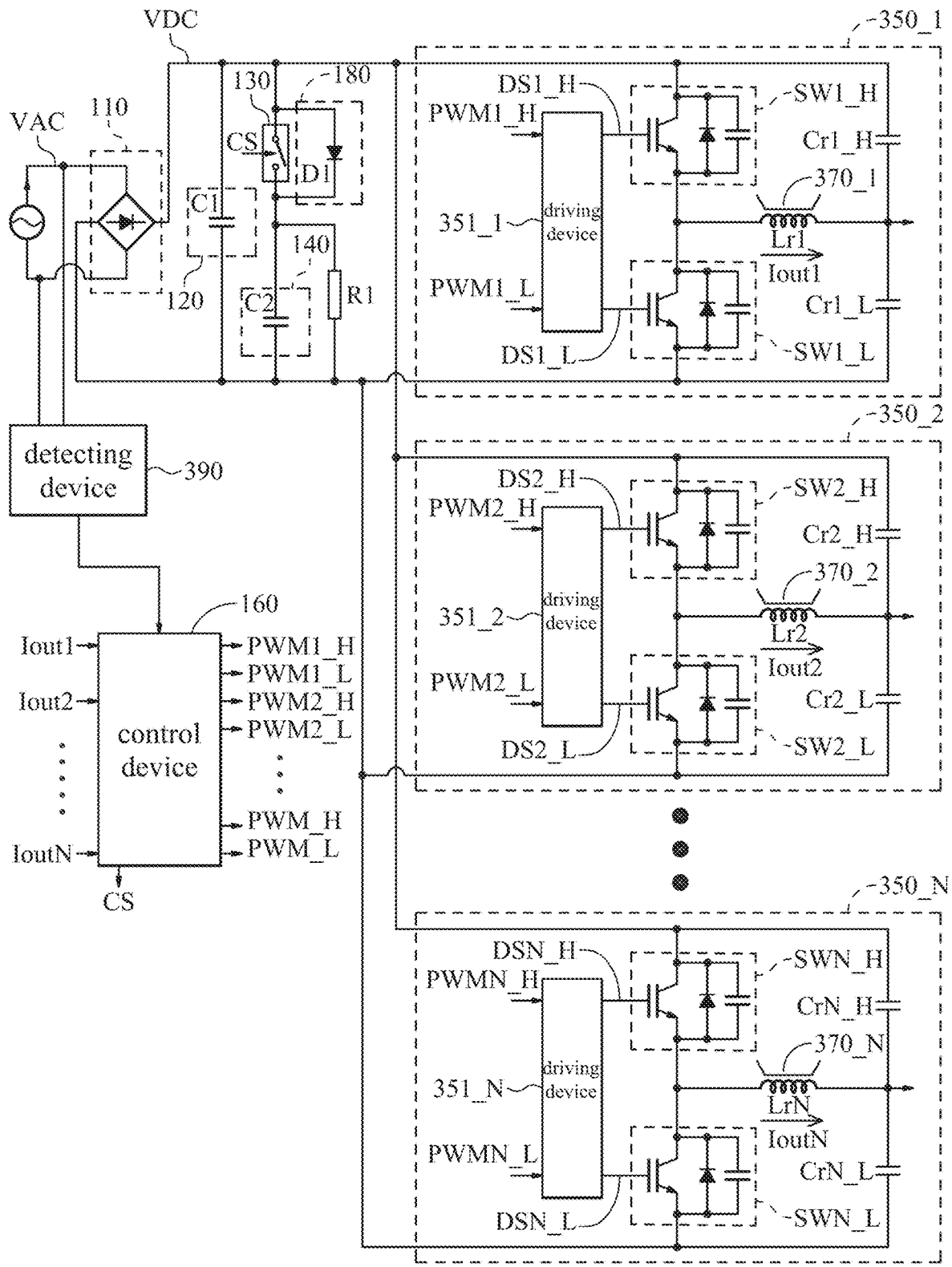
FIG. 3 shows a schematic view of an induction cooker according to another embodiment of the present invention.

FIG. 3 shows a schematic view of an induction cooker according to another embodiment of the present invention. The induction cooker 300 includes a rectifying device 110, a first energy-storage device 120, a switch device 130, a second energy-storage device 140, a plurality of heating devices 350_1~350_N, a control device 160 and a detecting device 390, wherein N is a positive integer greater than 1. In the embodiment, the rectifying device 110, the first energy-storage device 120, the switch device 130, the second energy-storage device 140 and the control device 160 in FIG. 3 are equal to or similar to the rectifying device 110, the first energy-storage device 120, the switch device 130, the second energy-storage device 140 and the control device 160 in FIG. 1. The rectifying device 110, the first energy-storage device 120, the switch device 130, the second energy-storage device 140 and the control device 160 in FIG. 3 may refer to the description of the embodiment of FIG. 1, and the description thereof is not repeated herein.

The heating devices 350_1~350_N are coupled in parallel and coupled to the first energy-storage device 120, the switch device 130 and the control device 160. In the embodiment, the heating device 350_1~350_N includes driving devices 351_1~351_N, high-frequency switch devices SW1_H~SWN_H, high-frequency switch devices SW1_L~SWN_L, coils Lr1~LrN, capacitors Cr1_H~CrN_H and capacitors Cr1_L~CrN_H. In addition, the coupling relationship of the internal components of the heating devices 350_1~350_N may refer to the description of the heating device 150 of FIG. 1, and the description thereof is not repeated herein.

The detecting device 390 is coupled to the control device 160, and receives the alternating-current voltage VAC to generate the detecting signal, wherein the detecting signal includes the change state of the alternating-current voltage VAC. Then, the detecting device 390 provides the detecting signal to the control device 160, so as to perform the subsequent operation.

In an entire operation of the induction cooker 300, firstly, the control device 160 generates the control signal CS to control the switch device 130 to be turned off, so that the heating devices 350_1~350_N generate output currents Iout1~IoutN according to the energy of the first energy-storage device 120. The control device 160 determines whether pots 370_1~370_N are disposed on the heating devices 350_1~350_N according to the change states of the output currents Iout1~IoutN.

When determining that the pots 370_1~370_N are not disposed on the heating devices 370_1~370_N, it indicates that the states of the output currents Iout1~IoutN are not changed. The control device 160 generates the control signal CS to control the switch device to maintain to be turned off, and continuously determines whether the pots 370_1~370_N are on the heating devices.

In addition, when determining that the pot is disposed on at least one of the heating devices 350_1~350_N, for example, the pot 370_1 is disposed on the heating device 350_1, it indicates that the state of the output current Iout1 is changed. The control device 160 generates the control signal CS to control the switch device 130 to be turned on, so that the first storage energy device 120 is coupled to the second energy-storage device 140, and the heating device 350_1 heats the pot 370_1 according to the energy of the first energy-storage device 120 and the energy of the second energy-storage device 140. Therefore, the transient current change rate generated by the heating device 350_1 may be effectively reduced, and the noise caused by the pot detecting operation is also reduced.

In addition, the control device 160 may also set the duty cycles of the pulse control signals PWM1_H~PWMN_H to the first ratio, and then gradually increases the duty cycles of the pulse control signals PWM1_H~PWMN_H from the first ratio to the second ratio, as shown in FIG. 2A and FIG. 2B, respectively. The adjustments of the duty cycles of the pulse control signals PWM1_H~PWMN_H may refer the descriptions of the embodiments of FIG. 2A and FIG. 2B, and the description thereof is not repeated herein.

In the operation of detecting the pot 370_1~370_N, the induction cooker 300 provides the energy of the first energy-storage device 120, and further gradually increases the duty cycles of the pulse control signals PWM1_H~PWMN_H from the first ratio to the second ratio through the control device 160. Therefore, the transient current change rates generated by the heating devices 350_1~350_N may be effectively reduces, and the noise caused by the pot detecting operation is also reduced.

In addition, when the pots 370_1~370_N are disposed not on the heating devices 350_1~350_N, the control device 160 controls the switch device 130 to maintain to be turned off, and the control device 160 may also reset the duty cycles of the pulse control signals PWM1_H~PWMN_H. That is, the control device 160 resets the duty cycles of the pulse control signals PWM1_H~PWMN_H to the first ratio, and again gradually increases the duty cycles of the pulse control signals PWM1_H~PWMN_H from the first ratio to the second ratio, and continuously determines whether the pots 370_1~370_N on the heating devices 350_1~350_N.

Assuming that after the heating device 350_1 heats the pot, the control device 160 determines the alternating-current voltage VAC approaches to a predetermined value according to the detecting signal. In the embodiment, the predetermined value is, for example, 0V. That is, the control device 160 determines whether the alternating-current voltage VAC approaches to 0V according to the detecting signal.

When determining that the alternating-current voltage VAC approaches to the predetermined value, the control device 160 may discontinue the operation of the heating device 350_1, i.e., the heating device 350_1 discontinues the heating of the pot 370_1. Then, the control device 160 may receive the output currents Iout2~IoutN of the heating devices 350_2~350_N Afterward, within a predetermined time, the control device 160 determines whether the pots 370_2~370_N are disposed on the heating device 350_2~350_N according to the change states of the output currents Iout2~IoutN. In the embodiment, the predetermined time is, for example, 500 microseconds.

When determining that the pot is disposed on at least one of the heating devices 350_2~350_N, for example, the pot 370_2 is disposed on the heating device 350_2, it indicates that the state of the output current Iout2 is changed. The control device 160 may control the heating device 350_1 to heat the pot 370_1 and control the heating device 350_2 to heat the pot 370_2. In addition, the operation of detecting whether the pot is disposed on the rest of heating devices 350_3~350_N may refer to the description of the above embodiments, and the description thereof is not repeated herein.

Furthermore, when determining that the pots 370_2~370_N are not disposed on the heating devices 350_2~350_N, the control device 160 again determines whether the alternating-current voltage VAC approaches to the predetermined value according to the detecting signal, and continuously determines whether the pots 370_2~370_N are on the heating devices 350_2~350_N.

In the embodiment, the induction cooker 300 also includes a protection device 180 and a resistor R1. In the embodiment, the protection device 180 and the resistor R1 in FIG. 3 are equal to or similar to the protection device 180 and the resistor R1 in FIG. 1. The protection device 180 and the resistor R1 in FIG. 3 may refer to the description of the embodiment of FIG. 1, and the description thereof is not repeated herein.

Figure 4:
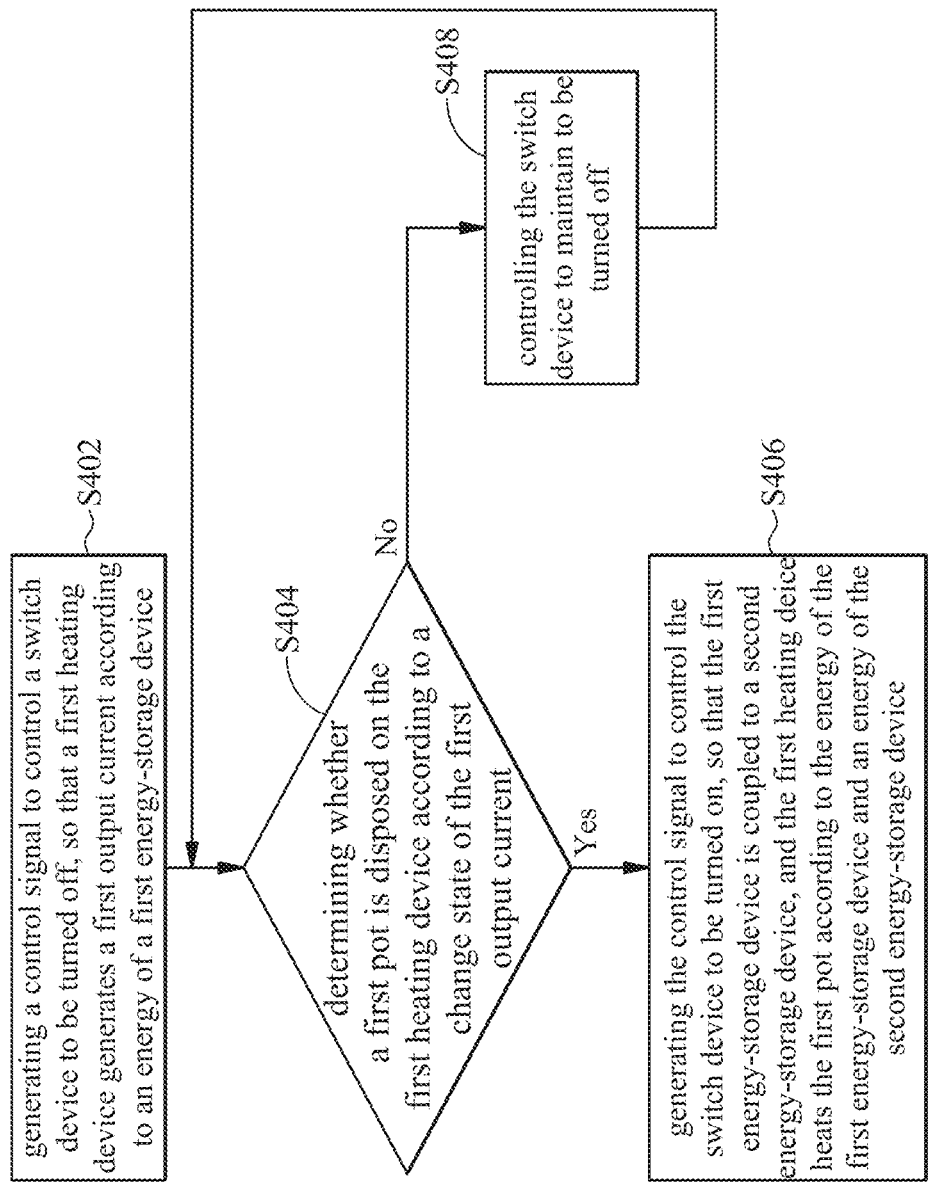
FIG. 4 shows a flowchart of an operation method of an induction cooker according to an embodiment of the present invention.

FIG. 4 shows a flowchart of an operation method of an induction cooker according to an embodiment of the present invention. In step S402, the method involves generating a control signal to control a switch device to be turned off, so that a first heating device generates a first output current according to an energy of a first energy-storage device. In step S404, the method involves determining whether a first pot is disposed on the first heating device according to a change state of the first output current.

When determining that the first pot is disposed on the first heating device, the method enters to step S406. In step S406, the method involves generating the control signal to control the switch device to be turned on, so that the first energy-storage device is coupled to a second energy-storage device, and the first heating deice heats the first pot according to the energy of the first energy-storage device and an energy of the second energy-storage device. When determining that the first pot is not disposed on the first heating device, the method enters to step S408. In the step S408, the method involves controlling the switch device to maintain to be turned off. Then, the method returns to step S404 to continuously determine whether the first pot is on the first heating device. In the embodiment, the capacitance of the second energy-storage device is greater than the capacitance of the first energy-storage device.

Figure 5:
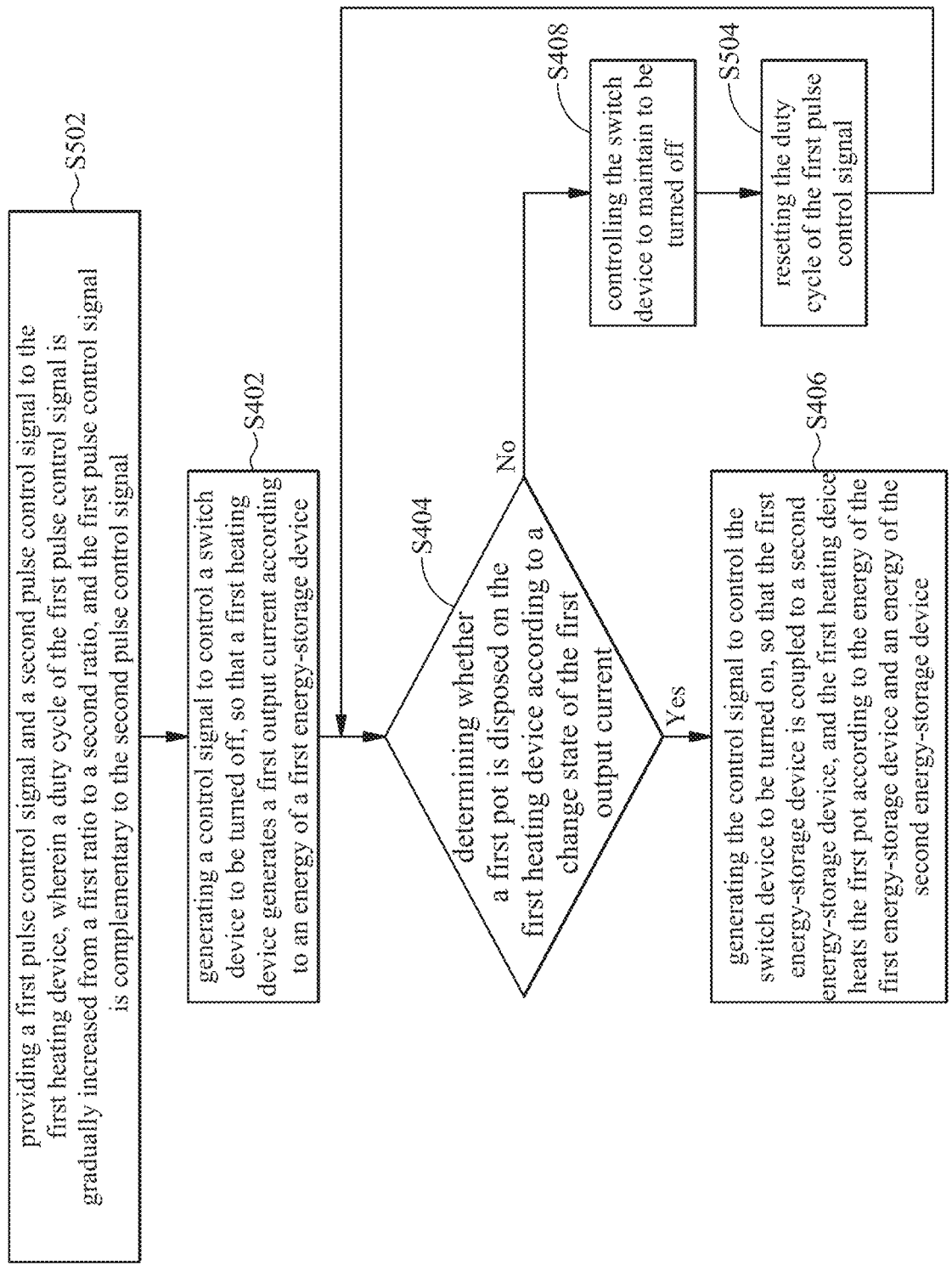
FIG. 5 shows an operation method of an induction cooker according to another embodiment of the present invention.

FIG. 5 shows an operation method of an induction cooker according to another embodiment of the present invention. In the embodiment, steps S402~S408 in FIG. 5 are equal to steps S402 in FIG. 4. Steps S402~S408 in FIG. 5 may refer to the description of the embodiment of FIG. 4, and the description thereof is not repeated herein.

In step S502, the method involves providing a first pulse control signal and a second pulse control signal to the first heating device, wherein a duty cycle of the first pulse control signal is gradually increased from a first ratio to a second ratio, and the first pulse control signal is complementary to the second pulse control signal. In step S504, the method involves resetting the duty cycle of the first pulse control signal. Then, the method returns to step S502 to continuously determine whether the first pot is on the first heating device.

Figure 6A:
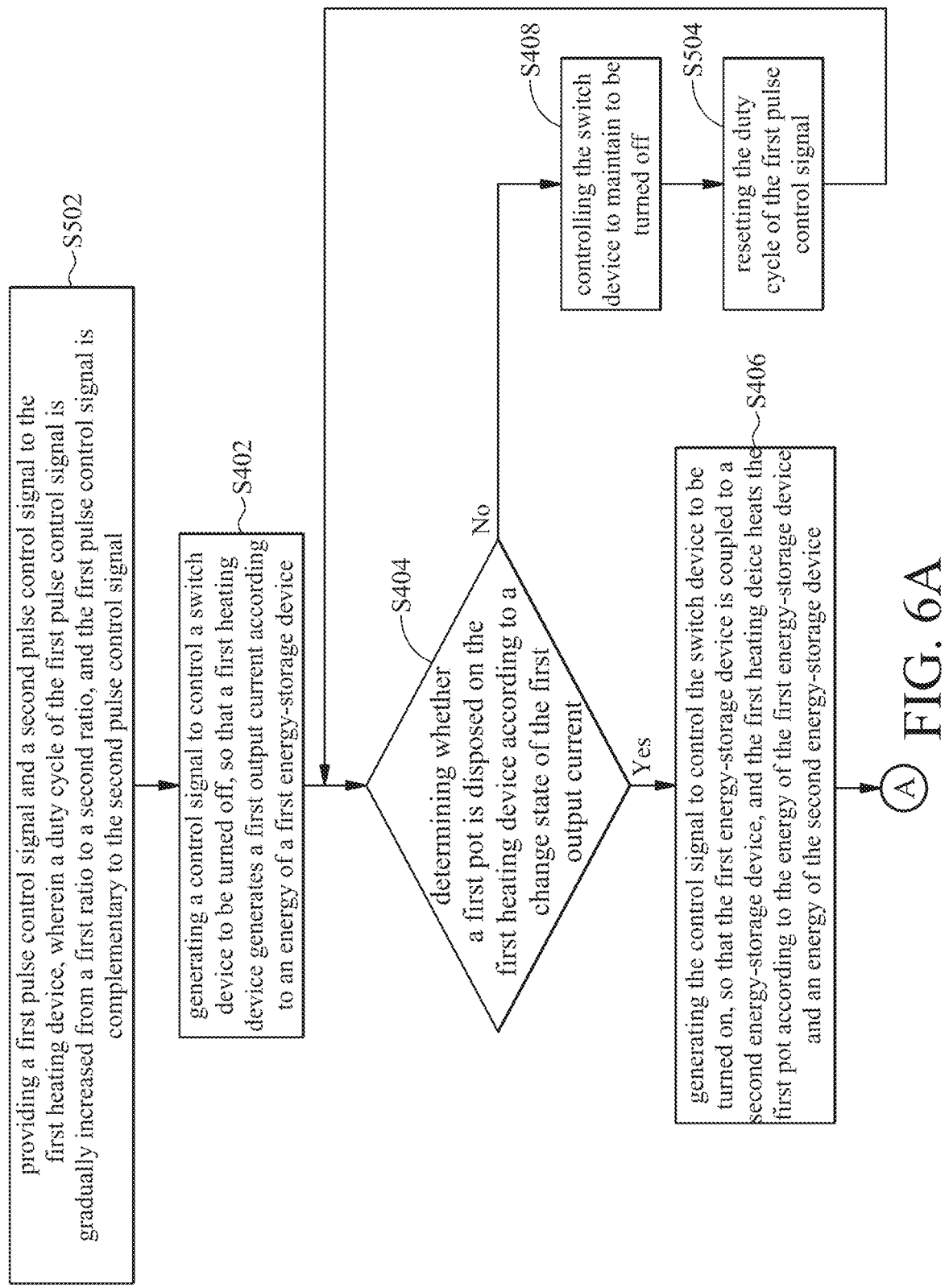
FIGS. 6A and 6B show a flowchart of an operation method of an induction cooker according to another embodiment of the present invention.
Figure 6B:
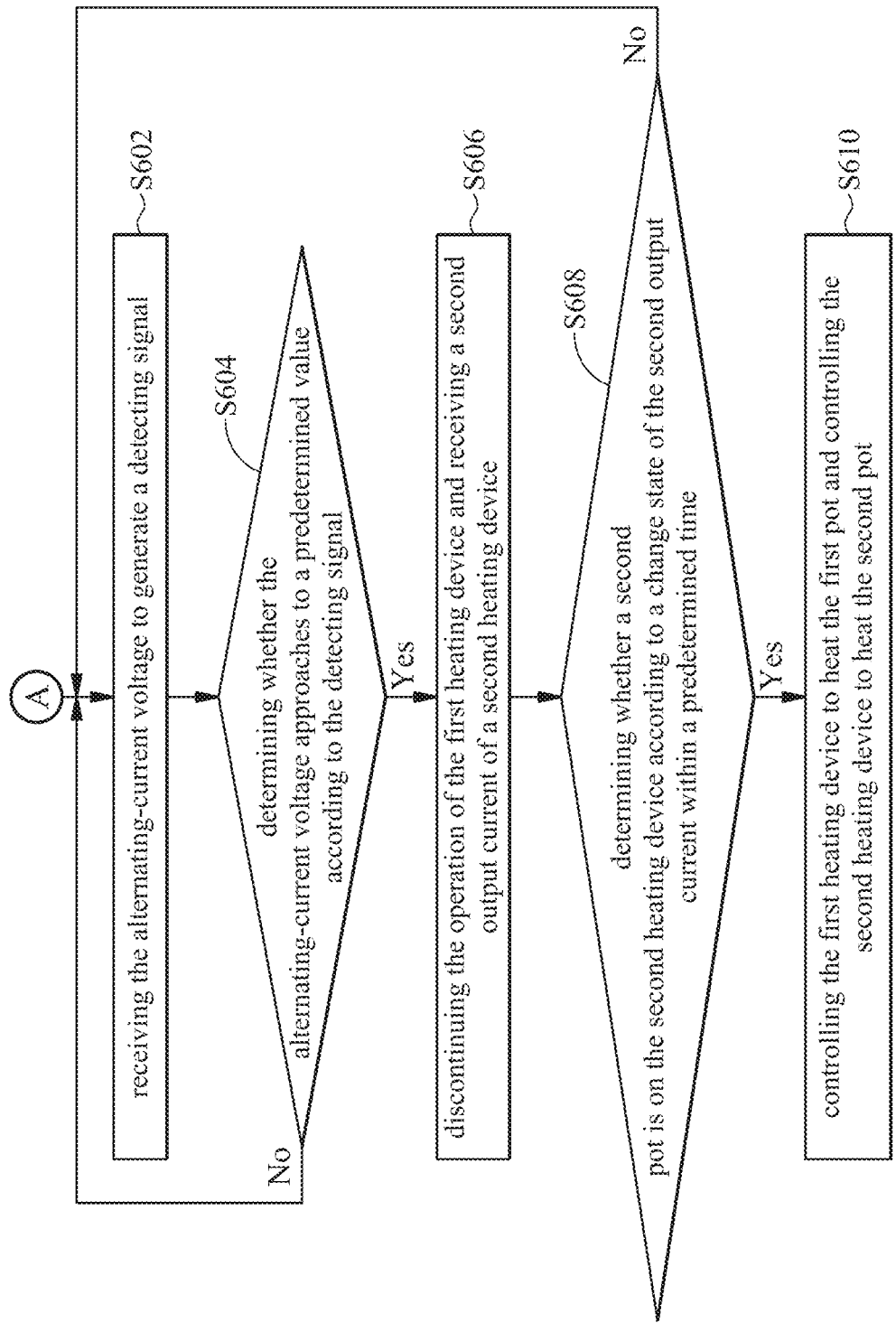

FIGS. 6A and 6B show a flowchart of an operation method of an induction cooker according to another embodiment of the present invention. In the embodiment, steps S402~S408 and steps 502~504 in FIG. 6A are equal to steps S402~S408 and steps S502~504 in FIG. 5. Steps S402~S408 and steps 502~504 in FIG. 6A may refer to the description of the embodiment of FIG. 5, and the description thereof is not repeated herein.

In step S602, the method involves receiving the alternating-current voltage to generate a detecting signal. In step S604, the method involves determining whether the alternating-current voltage approaches to a predetermined value according to the detecting signal. When determining that the alternating-current voltage does not approach to the predetermined value, the method returns to step S602 to receive the alternating-current voltage again, and continuously determines whether the alternating-current voltage approaches to the predetermined value. When determining that the alternating-current voltage approaches to the predetermined value, the method enters step S606. In step S606, the method involves discontinuing the operation of the first heating device and receiving a second output current of a second heating device.

In step S608, the method involves determining whether a second pot is on the second heating device according to a change state of the second output current within a predetermined time. When determining that the second pot is on the second heating device, the method enters step S610. In step S610, the method involves controlling the first heating device to heat the first pot and controlling the second heating device to heat the second pot. When determining that the second is not on the second heating device, the method returns to step S602 to continuously receive the alternating-current voltage to generate the detecting signal, so as to perform the subsequent operation.

In summary, according to an induction cooker and an operation method thereof of the present invention, the control device generates the control signal to control the switch device to be turned off, so that the first heating device generates the first output current according to the energy of the first energy-storage device. The control device determines whether the first pot is on the first heating device according to the change state of the first output current. When determining that the first pot is on the first heating device, the control device generates the control signal to control the switch device to be turned on, so that the first energy-storage device is coupled to the second energy-storage device, and the first heating device heats the first pot according to the energy of the first energy-storage device and the energy of the second energy-storage device. Therefore, the transient current change rate generated by the heating device may be effectively reduced, and the noise caused by the pot detecting operation is also reduced.

In addition, in the embodiment of the present invention, the control device further generates the first pulse control signal and the second pulse control signal, and then gradually increases the duty cycle of the first pulse control signal from the first ratio to the second ratio, wherein the first pulse control signal is complementary to the second pulse control signal. Therefore, the embodiment of the present invention may further effectively reduce the transient current change rate generated by the first heating device, and also reduce the noise caused by the pot detecting operation. Furthermore, when overcurrent is generated, the protection device is activated to release the overcurrent. Therefore, damage to circuit component may be effectively avoided and overcurrent tolerance may be increased.

In addition, after the first heating device heats the first pot, the control device may further determine whether the second pot is on the second heating device. When determining that the pot is on the second heating device, the control device controls the first heating device to heat the first pot and controls the second heating device to heat the second pot. Therefore, the convenience of use may be increased.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An induction cooker, comprising:
   a rectifying device, configured to receive an alternating-current voltage and to convert the alternating-current voltage into a direct-current voltage;
   a first energy-storage device, coupled to the rectifying device and configured to receive the direct-current voltage and to store energy;
   a switch device, coupled to the first energy-storage device and configured to be controlled by a control signal;

a second energy-storage device, coupled to the switch device, wherein a capacitance of the second energy-storage unit is greater than a capacitance of the first energy-storage unit;

a first heating device, coupled to the first energy-storage device and the switch device; and a control device, coupled to the switch device and the first heating device, wherein the control device configured to generate the control signal to control the switch device to be turned off, so that the first heating device generates a first output current according to the energy of the first energy-storage device, the control device determines whether a first pot is disposed on the first heating device according to a change state of the first output current, when determining that the first pot is disposed on the first heating device, the control device generates the control signal to control the switch device to be turned on, so that the first energy-storage device is directly coupled to the second energy-storage device in parallel to form an equivalent energy-storage device having a sum of the capacitance of the first energy-storage device and the capacitance of the second energy-storage device, and the first heating device uses an energy corresponding to the equivalent storage-device to heat the first pot;

when determining that the first pot is not disposed on the first heating device, the control device controls the switch to keep being turned off;

wherein during the switch device is turned off, the control device further provides a first pulse control signal and a second pulse control signal to the first heating device, wherein the first pulse control signal is complementary to the second pulse control signal, the first pulse control signal comprises a first signal, a second signal following the first signal, and a third signal following the second signal, a ratio of a duty cycle of the second signal is greater than a ratio of a duty cycle of the first signal, and a ratio of a duty cycle of the third signal is greater than the ratio of the duty cycle of the second signal.

2. The induction cooker as claimed in claim 1, wherein when determining that the first pot is not disposed on the first heating device, the control device further resets the duty cycle of the first pulse control signal.

3. The induction cooker as claimed in claim 1, further comprising:

a second heating device, coupled to the first energy-storage device, the switch device, the control device and the first heating device; and a detecting device, coupled to the control device, and configured to receive the alternating-current voltage to generate a detecting signal;

wherein after the first heating device heats the first pot, the control device determines whether the alternating-current voltage approaches to a predetermined value according to the detecting signal, when determining that the alternating-current voltage approaches to the predetermined value, the control device discontinues the operation of the first heating device and receives a second output current of the second heating device, the control device determines whether a second pot is disposed on the second heating according to a change state of the second output current within a predetermined time, and when determining the second pot is disposed on the second heating device, the control device controls the first heating device to heat the first pot and controls the second heating device to heat the second pot.

4. The induction cooker as claimed in claim 3, wherein when determining the second pot is not disposed on the second heating device, the control device again determines whether the alternating-current voltage approaches to the predetermined value according to the detecting signal and continuously determines whether the second heating device is disposed on the second heating device.

5. The induction cooker as claimed in claim 1, further comprising:

a protection device, coupled to the switch device in parallel, wherein when an overcurrent is occurred, the protection device is activated to release the overcurrent.

6. The induction cooker as claimed in claim 5, further comprising: a resistor, directly coupled to the protection device in series, wherein when the overcurrent is occurred and the protection device is activated, the resistor provides a discharging path to release the overcurrent.

7. An operation method of an induction cooker, comprising:

generating a control signal to control a switch device to be turned off, so that a first heating device generates a first output current according to an energy of a first energy-storage device;

determining whether a first pot is disposed on the first heating device according to a change state of the first output current; and when determining that the first pot is disposed on the first heating device, generating the control signal to control the switch device to be turned on, so that the first energy-storage device is directly coupled to a second energy-storage device in parallel to form an equivalent energy-storage device having a sum of a capacitance of the first energy-storage device and a capacitance of the second energy-storage device, and an energy corresponding to the equivalent storage-device is used to heat the first pot;

when determining that the first pot is not disposed on the first heating device, controlling the switch to keep being turned off;

providing a first pulse control signal and a second pulse control signal to the first heating device, wherein the first pulse control signal is complementary to the second pulse control signal, the first pulse control signal comprises a first signal, a second signal following the first signal, and a third signal following the second signal, a ratio of a duty cycle of the second signal is greater than a ratio of a duty cycle of the first signal, and a ratio of a duty cycle of the third signal is greater than the ratio of the duty cycle of the second signal;

wherein the capacitance of the second energy-storage device is greater than the capacitance of the first energy-storage device.

8. The operation method of the induction cooker as claimed in claim 7, wherein after the step of when determining that the first pot is not disposed on the first heating device, controlling the switch to maintain to be turned off, the operation method further comprises:

resetting the duty cycle of the first pulse control signal.

9. The operation method of the induction cooker as claimed in claim 7, further comprising:

receiving the alternating-current voltage to generate a detecting signal;

determining whether the alternating-current voltage approaches to a predetermined value according to the detecting signal;

when determining that the alternating-current voltage approaches to the predetermined value, discontinuing the operation of the first heating device and receiving a second output current of a second heating device;

determining whether a second pot is disposed on the second heating device according to a change state of the second output current within a predetermined time; and when determining that the second pot is disposed on the second heating device, controlling the first heating device to heat the first pot and controlling the second heating device to heat the second pot.

10. The operation method of the induction cooker as claimed in claim 9, further comprising:

when determining that the second pot is not disposed on the second heating device, returning the step of receiving the alternating-current voltage to generate the detecting signal.

* * * * *